Dec. 19, 1967 G. E. BJÖRKLUND 3,358,443
HYDROSTATIC TRANSMISSION
Filed March 14, 1966
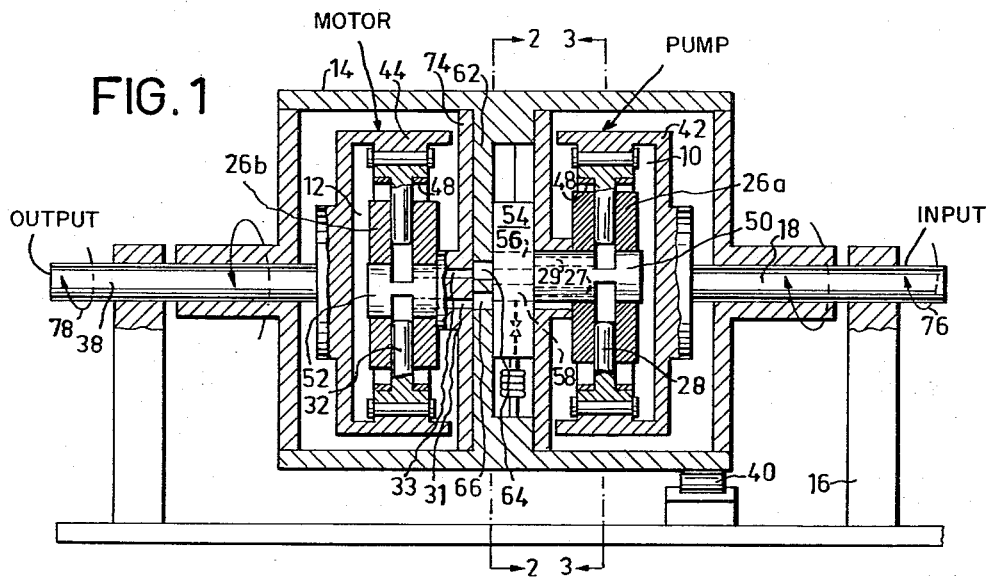
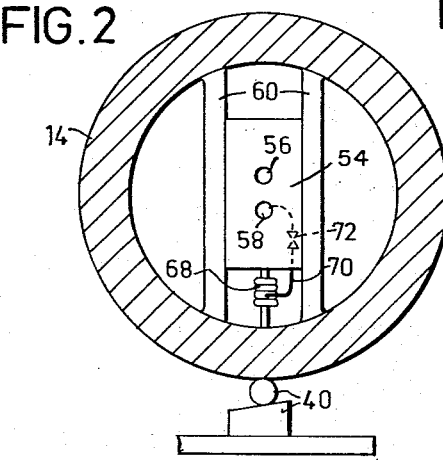 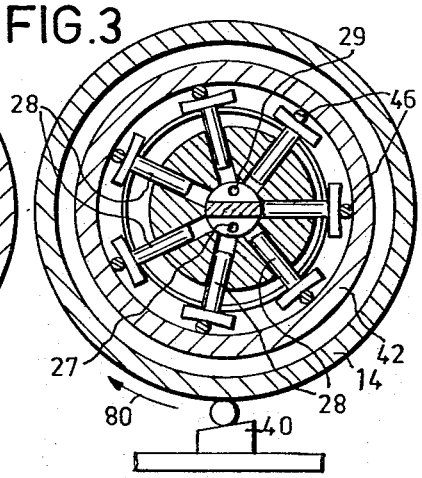
INVENTOR.
GUSTAF ERIK BJÖRKLUND
BY
Young + Thompson
ATTYS.

United States Patent Office 3,358,443
Patented Dec. 19, 1967

3,358,443
HYDROSTATIC TRANSMISSION
Gustaf Erik Björklund, Stockholm, Sweden, assignor to Rederi AB Soya, Hägersten, Sweden
Filed Mar. 14, 1966, Ser. No. 534,030
Claims priority, application Sweden, Mar. 15, 1965, 3,331/65
3 Claims. (Cl. 60—53)

ABSTRACT OF THE DISCLOSURE

A pump of the radial piston type is combined with a hydrostatic motor, preferably also of the radial piston type, to provide a hydrostatic transmission, and a bearing member is mounted on the input shaft of the pump and the output shaft of the motor. A locking device for the bearing member is adapted to prevent said bearing member from rotation and to take the existing reaction torque as long as the input torque on the pump shaft differs from the output torque on the motor shaft but to rotate together with said shafts when said torques become equal, said pump comprising a pintle mounted in said bearing member, a rotor on said pintle including cylinder spaces for the radial pistons, and means to displace said pintle and rotor for varying the stroke volume of the pump.

---

Hydraulic gears having a continuously variable gear ratio are known which consist of a pump and a motor which is driven by the fluid current from the pump and wherein the displacement of the pump and the motor is variable. The work of the pump is plainly hydraulically transmitted to the motor and, apart from the losses, the speed of the motor varies with the speed of the pump such that the speed ratio is inversely proportional to the ratio between the stroke volumes. The mechanical power (torque times speed) applied to the pump shaft is converted in the pump into hydraulical power (flow times pressure) and is taken by the motor and again converted therein into mechanical power. The power in the form of torque times speed can be applied to the machine to be driven. Certain losses occur in the transmission of power. However, hydraulic conversion is not necessary under all conditions of operation. A transmission adapted to be used like a gear box in a motor vehicle acts most of the time as a direct coupling without gear change, such gear change being required only at low vehicle speed and high load on the drive wheels.

Attempts have been made to avoid the above named conversion from plainly mechanical power into hydraulic power and vice versa by the provision of so called internal power shunt in hydraulic transmissions. Thereby it has become possible to transmit all or part of the power plainly mechanically from the input shaft to the output shaft without hydraulic conversion losses whereas the rest is hydraulically transmitted from the pump to the motor. In a known axial piston machine of this type transmission of the mechanical part takes place via a bearing member in the form of a casing which surrounds the pump and the motor and to which the output shaft of the transmission is secured.

In a known hydraulic transmission having axially working pistons there is a bearing case taking the reaction torque from the pump and motor only as long as the torque on the output shaft is not equal to the torque on the input shaft. A locking device prevents rotation of the bearing member due to the reaction torque. When the torque on the input shaft is equal to the torque on the output shaft the bearing member rotates as a unit together with the pump and motor and said shafts. In this case the transmission acts as a direct coupling.

However, it has proved advantageous to have a radial arrangement of the pistons of the pump and motor in hydrostatic gears operating with a locking device, since this enables a considerable reduction of the total axial dimension of the transmission. According to the invention the pump is of the radial piston type comprising a pintle having mounted thereon a rotor which includes cylinder spaces and pistons and together with the pintle is adjustable for varying the stroke volume of the pump, and that the pintle is mounted in the bearing member. Since the pump is rotated with its full number of revolutions after the pump and the motor begin to operate as a unit there is a balance problem arising. According to an important feature of the invention this problem is solved by the fact that the transmission is dynamically balanced if the pump stroke is adjusted such that the input torque of the transmission is equal to the output torque and the whole of the pump and the motor and the bearing member begins to rotate as a unit.

An embodiment of the invention will be described hereinbelow with reference to the annexed drawings. FIG. 1 is a longitudinal central section, FIG. 2 a radial section taken along the line 2—2 in FIG. 1, and FIG. 3 a radial section along the line 3—3 in FIG. 1.

The hydraulic transmission shown in the drawing comprises a radial piston pump 10 and a radial piston motor 12. Reference numeral 14 denotes a common bearing member formed as a casing and numeral 16 denotes a support in which the input shaft 18 of the pump and the output shaft 38 of the motor are mounted. A oneway locking device 40 is provided between the outer circumference of the bearing member and the stand. In the manner usual in radial piston machines movement of the pistons is obtained due to the fact that a cylinder block 26a of the pump and a cylinder block 26b of the motor are mounted on pintles 50 and 52, respectively, having ducts 27, 29 and 31, 33, respectively, for the hydraulic working fluid. Each pintle is disposed eccentrically relative to a rotor ring which surrounds the outer ends of the pistons and is centrally mounted on the shaft. The rotor ring of the pump shaft 18 is denoted at 42 and that of the motor shaft is denoted at 44. Entraining rollers 46 transmit power between the rotor ring and the pistons, and resilient rings 48 maintain the outer ends of the pistons in engagement with the rollers 46. The pintle 50 of the pump is radially displaceable for varying the eccentricity and, consequently, the piston displacement, whereas the pintle 52 of the motor is radially non-displaceable relative to the shaft 38. The pintle 50 is mounted on a slide 54 having ducts 56 and 58. The duct 56 provides communication between the ducts 29, 33 of the pintles 50, 52 and the duct 58 provides communication between the ducts 27, 32 of the pintles.

The slide 54 is radially displaceably guided between a pair of guide members 60 (FIG. 2) formed in a partition 62 of the bearing member 14. This partition has through holes 64, 66 providing communication between the pump and the motor. A control device 68 diagrammatically represented by a bellows is arranged to adjust the slide 54 in radial direction and thereby to control the displacement of the pump. By means of a conduit 70 having a control valve 72 the bellows communicates with the pressure duct 27 of the pump. If fluid under pressure is supplied into or withdrawn from the bellows the slide will be displaced and the eccentricity of the pintle 50 will be changed so as to vary the displacement of the pump. In contrast thereto the pintle 52 is non-displaceably mounted in a plate 74 in the bearing member 14. As a result thereof the displacement of the motor is constant.

Upon rotation of the shaft 18 in the direction indicated by the arrow 76 the cylinder block or rotor 26a takes part in this rotation and if the pintle 50 is adjusted in an eccentric position the pistons 28 in the pump cylinders will be actuated to force working fluid, usually oil, through the ducts 29 and 56 into the inlet duct 33 of the motor so that the cylinder block 26b of the motor will rotate. From the outlet duct 31 of the motor working fluid returns to the inlet duct 27 of the pump via the ducts 66 and 58. The motor is devised such that its shaft 38 rotates in the same direction as the pump shaft 18 as indicated by the arrow 78. The bearing member 14 tends to rotate in the reverse direction under the influence of the reaction torque on the pintles, but is prevented therefrom by the locking device 40. Only if the output shaft 38 is loaded by a torque equal to the torque on the input shaft 18 will the bearing member 14 take part in the rotation as indicated by the arrow 80 in FIG. 3.

The mass of the slide 54 results in a certain displacement of the centre of gravity of the transmission relative to the axis of rotation, but since the slide and the bearing member are stationary except during the time when the input torque is equal to the output torque, this displacement of the centre of gravity will not often affect the dynamic balance of the transmission. Only when the transmission begins to operate as a direct coupling is counter-balancing required.

Consequently, if the capacity of the pump has been adjusted such that the input torque and the output torque are equal and the entire pump and motor together with the bearing member 14 have begun to rotate, it is necessary to have the positions of the control members within the member 14 and the weight of the control members so adapted as to obtain a satisfactory dynamic balance of the rotary system.

What I claim is:

1. A hydrostatic transmission comprising a pump of the radial piston type and having its shaft arranged as an input shaft of the transmission, a hydrostatic motor having its shaft arranged as an output shaft of the transmission, a bearing member carried by said shafts and rotatable thereon, and a locking device for the bearing member, said locking device being adapted to prevent said bearing member from rotation and to take the existing reaction torque as long as the input torque on the pump shaft differs from the output torque on the motor shaft but to rotate together with said shafts as said torques have become equal, said pump including a pintle mounted in said bearing member, a rotor on said pintle including cylinder spaces for the radial pistons, and means to displace said pintle and rotor for varying the stroke volume of the pump.

2. A transmission as claimed in claim 1, characterized in that the motor is of the radial piston type having its pintle radially non-displaceably mounted in the bearing member.

3. A transmission as claimed in claim 1, characterized in that the transmission is dynamically balanced if the pump stroke is adjusted such that the input torque of the transmission is equal to the output torque and the whole of the pump and the motor and the bearing member begins to rotate as a unit.

References Cited

UNITED STATES PATENTS 3,131,540   5/1964   Ritter _____ 60—53

EDGAR W. GEOGHEGAN, *Primary Examiner.*